(No Model.)
S. G. EDWARDS.
BEE HIVE.
No. 358,850. Patented Mar. 8, 1887.
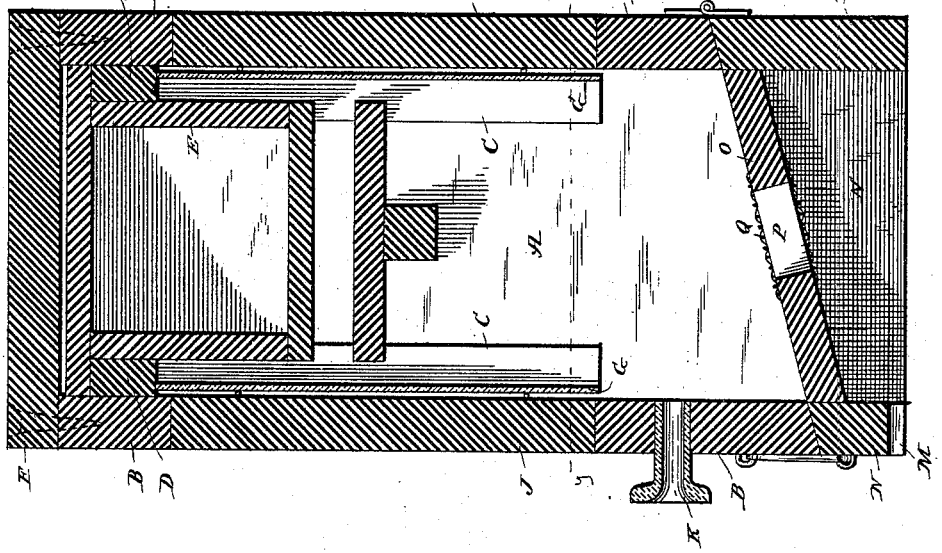
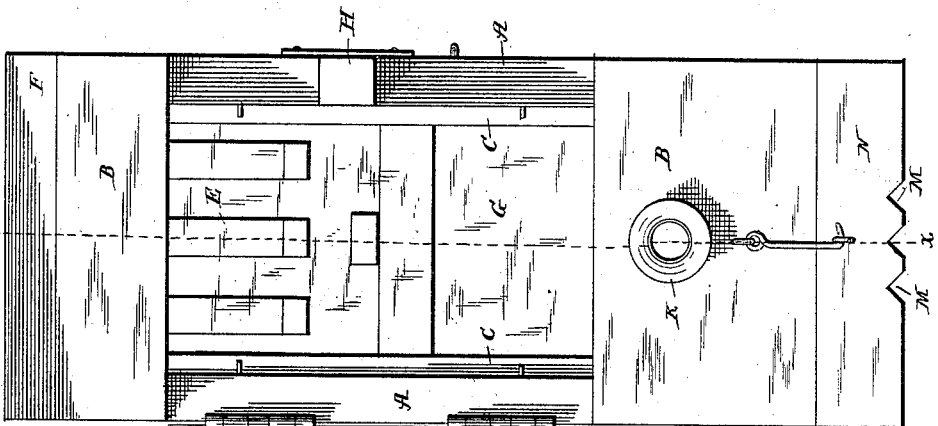
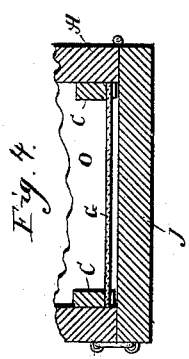
WITNESSES
Edwin L Bradford
H. A. Toulmin
INVENTOR
Samuel G. Edwards,
By—
Joe H Hunter
Attorney.
N. PETERS, Photo-Lithographer, Washington, D. C.

UNITED STATES PATENT OFFICE.

SAMUEL G. EDWARDS, OF ROSIER, MISSOURI.

BEE-HIVE.

SPECIFICATION forming part of Letters Patent No. 358,850, dated March 8, 1887.

Application filed November 16, 1886. Serial No. 219,000. (No model.)

*To all whom it may concern:*

Be it known that I, SAMUEL G. EDWARDS, a citizen of the United States, residing at Rosier, in the county of Bates and State of Missouri, have invented certain new and useful Improvements in Bee-Hives, of which the following is a specification, reference being had therein to the accompanying drawings.

This invention relates to certain new and useful improvements in bee-hives, the particulars whereof will be more fully hereinafter set forth and claimed.

In the accompanying drawings, forming a part of this specification, and on which similar letters of reference indicate the same or corresponding features, Figure 1 represents a face view of the hive with one of its doors open; Fig. 2, a vertical sectional view on the line x x of Fig. 1; Fig. 3, a detail view showing the slide; and Fig. 4, a sectional view on the line y y of Fig. 2, showing more clearly the manner in which the glass is held.

A designates the side walls of the hive, the same being composed of one or more boards, and B the top and bottom portions of the front and rear walls, to which the side walls are connected.

In the corners of the hive upright strips C are placed, upon which cross-pieces D rest, to receive the comb-frames E, which hang down into the hive and are movable therefrom by unscrewing the screws which secure the top F to the hive and lifting the top off. The strips C also form shoulders, against which the panes of glass G are placed and secured by any convenient means.

H refers to a slide, by which an aperture is opened and closed for the purpose of allowing the queen and swarm to pass from one hive to another, or not, as may be desired.

J designates the doors, one at the front and one at the rear of the hive, and hinged to the body thereof and adapted to inclose the panes G or expose them to view, according to whether the doors are closed or opened. When opened, the interior of the hive can be viewed and the condition of the honey ascertained while the bees are still at work.

At K a tube, preferably made of glass, is extended into the hive for the purpose of admitting the bees. This tube, being some distance above the ground, admits of the entrance of the bees, inasmuch as it is natural with them to fly into an opening which is above the ground, while it is the nature of moths to drop down and pass into openings at the ground. Because of this fact in the nature of moths I construct the moth-apartment L with passages M for the entrance of the moth, the passages being at the lowest point of the hive. This apartment consists of four walls, N, and of a partition, O, which forms the ceiling of the apartment and the floor of the hive. The partition has an opening, P, which is covered by the wire-gauze Q at the top and bottom, which prevents the entrance of the moth into the hive and the entrance of the bees into the moth-apartment. This opening also admits of due ventilation, the air passing through the passages M into the apartment and thence through the opening P into the hive. The apartment is hinged to the hive, preferably at the rear side, so that by turning the hive back the top of the partition is exposed, and any accumulation—such as dead bees and old fallen comb—may be removed.

I am aware that it is not broadly new to provide a hive with panes of glass covered by hinged doors, nor to provide the hive with a separate entrance for the bees and moths. I am further aware that it is not new to provide the side of the hive with an aperture covered by a slide, and I do not, therefore, wish to be understood as broadly laying claim to such; but

What I claim as new, and desire to secure by Letters Patent, is—

A bee-hive consisting of a hive proper having a removable top, removable comb-frames hung within the hive, a pane of glass at the front and rear, hinged doors composing a part of the front and rear and inclosing or exposing the panes, an aperture in one side and a slide for the aperture, an entrance for the bees, and a moth-apartment hinged to the lower end of the hive, passages at or near the ground leading into the apartment, and a partition between the apartment and hive having an aperture covered with gauze, substantially as set forth.

In testimony whereof I affix my signature in presence of two witnesses.

SAMUEL G. EDWARDS.

Witnesses:
W. P. HULL,
AUSTIN HATCHER.